Nov. 30, 1943.   H. H. RUDD   2,335,543
ELECTRICAL BUS SYSTEM
Filed March 18, 1940   3 Sheets-Sheet 1
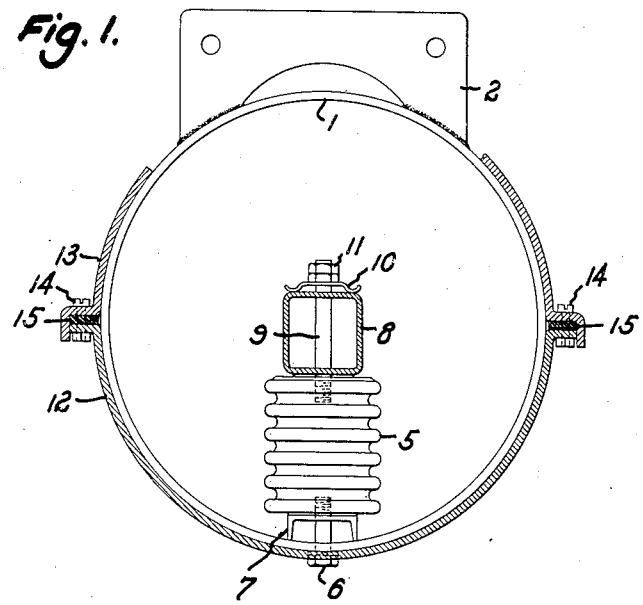
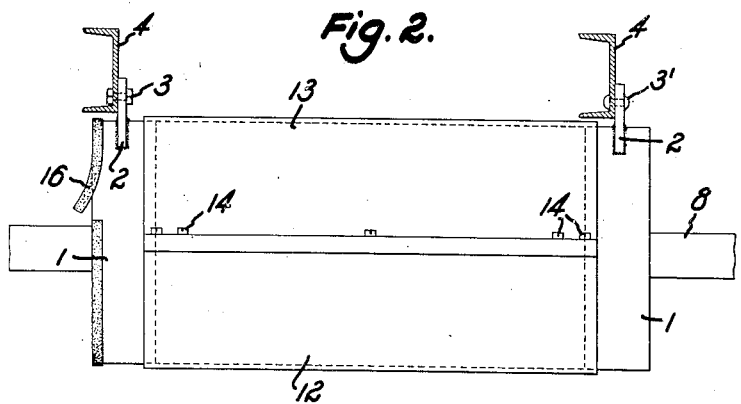
Inventor:
Harold H. Rudd,
By Potter, Pierce & Scheffler,
Attorneys.

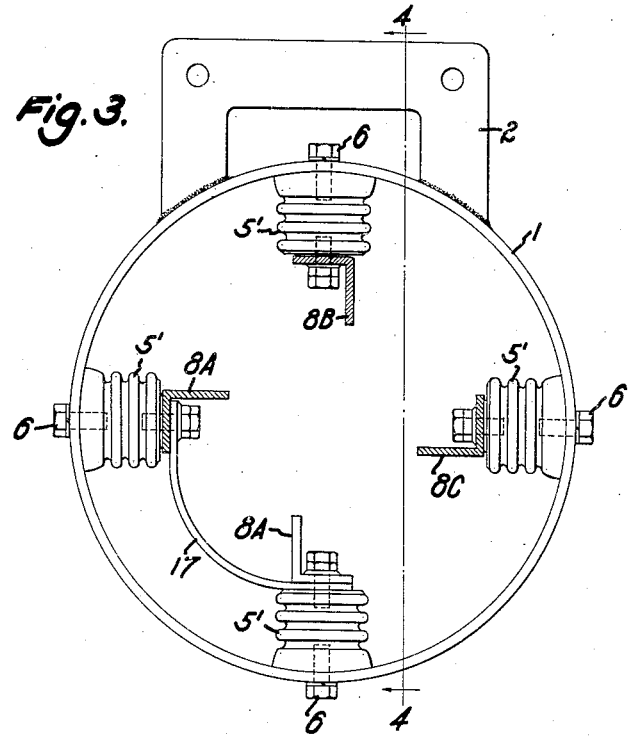
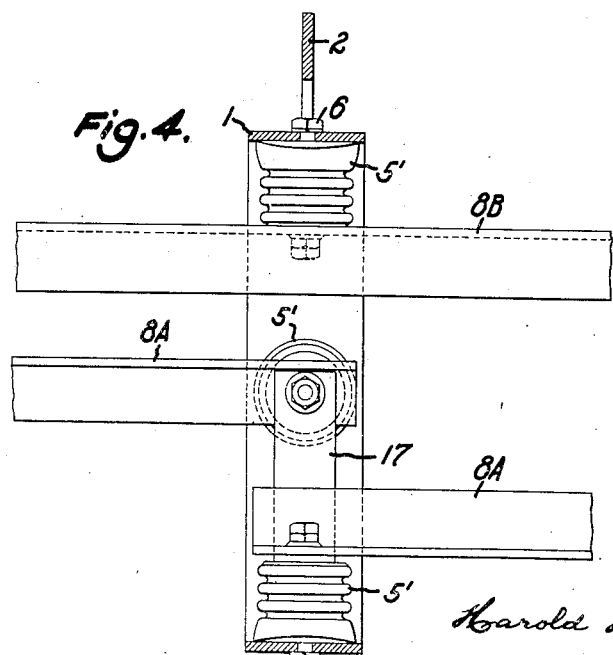

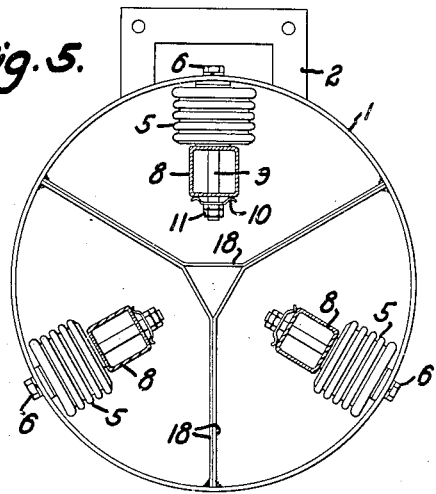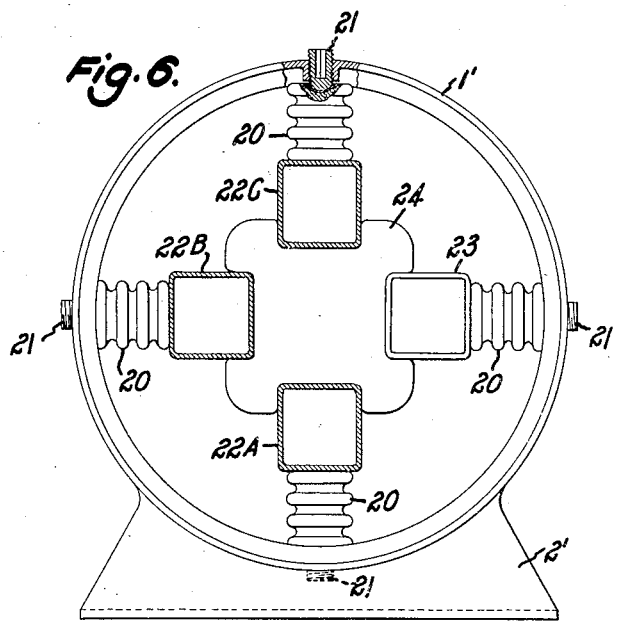

Patented Nov. 30, 1943

2,335,543

UNITED STATES PATENT OFFICE 2,335,543

ELECTRICAL BUS SYSTEM

Harold H. Rudd, Greensburg, Pa., assignor to Railway and Industrial Engineering Company, Greensburg, Pa., a corporation of Delaware Application March 18, 1940, Serial No. 324,729

4 Claims. (Cl. 174—99)

This invention relates to electrical bus systems and particularly to systems in which the conductors are hollow tubes, angle bars or channel bars.

An object of the invention is to provide a bus system including spaced ring frames that extend around the conductors of a three-phase distribution system, and three insulators in each frame and angularly spaced to support the several conductors. A further object is to provide a three-phase bus system of the type last stated in which the insulators are spaced by 90°, whereby the location of one of the conductors may be varied by 90° at different parts of the bus system to facilitate tap connections either laterally or vertically of the bus system.

These and other objects and advantages of the invention will be apparent from the following specification when taken with the accompanying drawings in which:

Fig. 1 is a transverse section through a metal enclosed bus embodying the invention, part of the cover plates being broken away;

Fig. 2 is an elevation of a section of the enclosed bus of Fig. 1;

Fig. 3 is a transverse section of a ring frame of a three-phase bus system, the location of one bus being shifted through 90° at the illustrated ring frame;

Fig. 4 is a vertical section in the plane of line 4—4 of Fig. 3; and

Figs. 5 and 6 are transverse sections through other three-phase bus systems that embody the invention.

In Figs. 1 and 2, the reference numeral 1 identifies a short cylinder of non-magnetic metal, such as a high chrome or manganese steel, to which a yoke or plate 2 is welded to form a supporting ring or frame. The plate 2 is arranged substantially centrally of the cylinder 1 in a plane normal to the axis of the ring, and is apertured to receive bolts 3 or rivets 3' to mount the frame on a rigid support that may comprise structural steel members 4. A cylindrical insulator 5 is mounted radially of each frame by a bolt 6 that is threaded into the customary metal insert, not shown, of the insulator and a short channel-shaped member 7 is positioned between the lower end of the cylinder and the cylindrical section 1 of the frame to permit use of the conventional cylindrical insulators with end faces normal to the insulator axis. A bus or conductor 8 is supported on the insulators 5 and axially of the frame sections 1 by studs 9 that are cemented into the insulators or threaded into inserts, not shown, in the insulators. The bus may be of any desired cross-section and when, as illustrated, tubular conductors are used, springs 10 are preferably arranged between the bus and the clamping nuts 11 to take up expansion due to temperature changes.

Mating half-shells 12, 13 of non-magnetic metal are clamped to each other and upon adjacent frames by bolts 14 to form a duct or housing that encloses the conductor. Gaskets 15 of leather, rubber or the like are arranged between the flanges of the shells 12, 13, and adhesive strips 16 are applied to the frame to provide a substantially tight sealing of the duct. A hermetic seal is not essential as air is preferably employed as the dielectric medium, but a free movement of the air into and out of the duct with temperature changes is to be avoided.

The other conductor or conductors of the bus system will be supported and enclosed by structures identical with those shown for the bus 8 when the operating conditions require the isolation of the several conductors by separate grounded housings. All of the conductors may be supported by a single set of ring frames, as shown in Figs. 3 and 4, when the buses are operated at relatively low potentials.

The ring frames may comprise a tubular section 1 and yokes 2 that are identical with those shown in Figs. 1 and 2. Four insulators 5' are secured to the ring frame by bolts 6, the insulators being uniformly spaced by 90°. Only three insulators are required to support the three conductors 8A, 8B, 8C, throughout the major portion of the bus system and four insulators are required only at transition points where the angular location of one conductor is altered to facilitate a change in the direction of the bus system or the tapping off of a branch line. As illustrated, the conductor 8A approaches the ring frame from the left side of Fig. 4 on the horizontal center line of the frame and leaves towards the right at a lower elevation on the vertical center line of the frame, the connection between the sections 8A being provided by the jumper strip 17. The conductors may be of any desired cross-section, for example angle bars, and the spacing of the conductors as measured in horizontal and vertical planes is such that a branch line may be run in a vertical direction from the bus system at the left side of the ring frame of Fig. 4 or in a horizontal direction from the right side of the ring frame. Half-shells may be applied to the ring frames, as previously described, when the operating conditions call for an enclosure of the bus conductors.

The ring frame and bus supports shown in Fig. 5 may be used when the line potential is such that the frames must have tubular sections 1 of large diameter to provide adequate spacing of the conductors 8 of a three-phase system. The several conductors 8 are carried by cylindrical insulators 5 that are uniformly spaced at 120°, and reinforcing strips 19 are arranged between the conductors and welded to each other and to the frames to provide strength for resisting mechanical stresses under normal and overload conditions.

As shown in Fig. 6, the ring frame may be a casting of aluminum, bronze or other non-magnetic material comprising an annular section 1' and a supporting flange 2', the construction being similar to that described in my copending application, Ser. No. 167,639, filed October 6, 1937, on which Patent No. 2,275,203 issued March 3, 1942. Insulators 20 are adjustably mounted on and in the plane of the frame by screws 21, and bear against tubular conductors 22A, 22B, 22C and a "dummy" conductor or insulator block 23 that seats upon a grooved block 24 of insulating material. The cylindrical insulators 20 are subjected only to compression stresses, and mechanical connections between the insulators and the bus conductors are not required. The angular location of the conductors may be varied, as described above with reference to Figs. 3 and 4, to facilitate a change of direction or branch connections without increasing the diameter of the duct.

It is to be understood that the invention is not restricted to the particular structures herein shown and described as various changes may be made in the shape, size and relative location of the component parts of the bus system without departure from the spirit of my invention as set forth in the following claims.

I claim:

1. In a three-phase bus system, a conductor for each phase, the three conductors being in spaced parallel relation, a supporting frame of ring form encircling said conductors, means for securing the ring frame rigidly to a supporting structure, three cylindrical insulators mounted on and extending radially inward from the inner surface of the supporting frame, said insulators being angularly spaced by 90°, and means securing the conductors to the inner ends of the respective insulators.

2. In a three-phase bus system, a conductor for each phase, the three conductors being in spaced and substantially parallel relation, a supporting frame of ring form encircling said conductors, means for securing said frame to a supporting structure, three cylindrical insulators extending radially inward from the inner surface of said frame, means securing the conductors to the inner ends of said insulators, and screw-threaded members extending through said supporting frame to mount the insulators upon the same; said supporting frame having four openings uniformly spaced about its periphery to receive said screw-threaded members, whereby the relative location of one of said conductors may be changed by 90° in accordance with the angular arrangement of the cylindrical insulator to which that conductor is secured.

3. In an electrical bus system, a plurality of conductors, a supporting frame of ring form encircling said conductors, and insulating means within said ring frame to support said conductors in spaced parallel relation; said insulating means comprising a centrally located block of insulating material having diametrically opposed grooves in which the respective conductors are seated, insulators engaging the several conductors and extending radially towards said frame, and means adjustable on said supporting frame to force said insulators to press the associated diametrically alined conductors against said centrally located block to support said block and conductors within the supporting frame by compression stresses transmitted through said insulators to diametrically spaced portions of the supporting frame.

4. In a bus system, three tubular conductors forming the bus of a three-phase system, a supporting frame of ring form encircling said conductors, an insulating block at the center of the ring and having three grooves spaced by 90° for engagement by the respective tubular conductors, three insulators adjustably mounted on the supporting frame for engaging said conductors to press the same towards the insulating block, and means including a fourth insulator adjustably mounted on said supporting frame for exerting pressure on said insulating block in the axial plane of the central conductor, said insulators being angularly spaced by 90°.

HAROLD H. RUDD.